United States Patent [15] 3,676,384
Rheineck et al. [45] July 11, 1972

[54] COPOLYMERS OF HYDROXYALKYL METHACRYLATES AND AN ACRYLATE OF METHACRYLATE ESTER REACTED WITH A PARTIALLY EPOXIDIZED DRYING OIL

[72] Inventors: Alfred E. Rheineck; Paul L. Nielsen, both of Fargo, N. Dak.; Teng H. Khoe, Peoria, Ill.

[73] Assignee: North Dakota State University Memorial Foundation, Fargo, N. Dak.

[22] Filed: May 6, 1970

[21] Appl. No.: 35,299

[52] U.S. Cl. ...................... 260/23 EP, 260/23 AR, 260/23 S
[51] Int. Cl. ........................................................... C08f 27/00
[58] Field of Search ................................. 260/23 EP, 23 AR

[56] References Cited

UNITED STATES PATENTS 3,215,757  11/1965  Scheibi et al. .......................... 260/23 X
3,236,795  2/1966  Graver .................................... 260/23

*Primary Examiner*—Donald E. Czaja
*Assistant Examiner*—Donald J. Barrack
*Attorney*—Burd, Braddock & Bartz and Robert W. Gutenkauf

[57] ABSTRACT

Coating compositions based upon acrylic resin copolymers having pendent reactive groups and a partially epoxidized drying oil. A partially epoxidized oil, as derived from linseed oil or safflower oil, is reacted in about equal oxirane-hydroxyl molar amounts with a copolymer of a hydroxyl-lower alkyl methacrylate with an acrylic monomer or mixture of monomers, such as methyl methacrylate and ethyl acrylate and homologous esters. Two alternate procedures, method A and method B are described. The resulting compositions form air drying coating films which are hard, glossy, flexible, non-yellowing, and chemically resistant. Baked films may also be obtained and these are very hard, glossy, flexible and chemically resistant.

13 Claims, No Drawings

COPOLYMERS OF HYDROXYALKYL METHACRYLATES AND AN ACRYLATE OF METHACRYLATE ESTER REACTED WITH A PARTIALLY EPOXIDIZED DRYING OIL

This invention relates to new coating compositions based on acrylic resin copolymers bearing pendent reactive hydroxyl groups and partially epoxidized drying oils such as linseed, safflower, sunflower, etc. The use of all drying oils in coatings is at an all time low. As an example, in the United States for 1968, the consumption was 236 million lbs. as compared to 730 million lbs. in 1960. With the advent of new synthetic resins, such as the polyacrylates, and polyvinyls, either in emulsions or solutions, the use of oils in all types of coatings has been displaced. In this same period very little research on oil modification or changes in composition was undertaken.

There are several problems involved with the use of linseed oil in coatings. For example, coatings which contain linseed oil have a strong tendency to "after yellow", particularly in the absence of direct light. In general, coating compositions based only on soft drying oils, such as soya bean, esterified tall oil, safflower, sunflower and linseed oils, yield films with relatively poor qualities. However, the presence of natural or synthetic resins, as in oleoresinous varnishes, and the phthalate-polyol esters in alkyd resins, will improve the film gloss, hardness, chemical resistance, drying time, general film appearance, and durability.

The present invention is based upon the discovery that improved coating compositions may be prepared by modification of partially epoxidized vegetable oils, such as linseed, safflower or sunflower, with a synthetic hydroxyl bearing resin. For example, pendent hydroxyls of a poly-acrylate resin may be reacted with the partially epoxidized oil via its epoxy group as a means whereby acrylic resins and oils can be combined to form high molecular weight polymers capable of forming films having high gloss, good hardness and flexibility.

Broadly stated, the invention comprises new coating compositions and the method of making them, the composition being the reaction product of a partially epoxidized drying oil with a hydroxy acrylic resin copolymer. The reaction is carried out by heating the materials in a mutual solvent in the presence of a catalyst under agitation for a sufficient time to substantially complete the reaction.

It has been found that the partially epoxidized linseed oil, PELO, should contain between about 2.2 to 9.4 per cent oxirane by weight. If the PELO contains less than about 2.2 per cent oxirane, an unstable film results. Partially epoxidized linseed oil and its method of preparation are disclosed in U.S. Pat. No. 3,242,196, issued Mar. 22, 1966. PELO for use in the practice of the present invention may be especially prepared for this purpose or may be purchased from one of several commercial sources offering PELO with oxirane contents ranging from 1.70 to 9.40.

In lieu of partially epoxidized linseed oil, PELO, other partially epoxidized drying oils such as safflower and sunflower oils may be used. Drying oils are defined as oils with an iodine value in excess of 150. Although oxirane derivatives of semi-drying oils, namely soya bean and tall oil may be used also, the quality of the acrylic copolymers of the latter oils and the acrylic resins used in this invention makes the semi-drying oils less desirable as starting materials. For the purposes of this invention, partially epoxidized linseed oil, PELO, is preferred.

The acrylic copolymers with a reactive hydroxyl group are formed by polymerization of a hydroxy lower-alkyl methacrylate and one or more acrylate or methacrylate esters, with or without styrene. The acrylic esters may be especially prepared or obtained from commercial sources. 2-hydroxyethyl methacrylate, HEMA, and hydroxypropyl methacrylate, HPMA, are commercially available (Rohm and Haas Company). Monomeric methacrylate esters which combine a readily polymerizable group and a reactive hydroxyl group in a single molecule and may be copolymerized with acrylate and/or methacrylate esters. Methyl methacrylate, MMA, and ethyl acrylate, EA, are preferred acrylic esters for copolymerization with the hydroxyl containing ester. Other esters, such as butyl and hexyl acrylates may be used.

The acrylic copolymer should contain between about 1.5 to 2.0 per cent hydroxyl by weight and have a molecular weight between about 3,000 to 5,700. The hydroxy alkyl acrylic ester and the acrylic esters with which it is polymerized are reacted in the ratio of about 1 part by weight of hydroxyalkyl methacrylate to about 3 to 8 parts of the other acrylic esters. Preferably equal parts of MMA and EA are employed. Thus, a suitable copolymer may be formed from 1 mole of HEMA or HPMA with 3 to 8 moles of a mixture made up of equal parts of MMA and EA. Other acrylic or methacrylesters may be substituted on an equivalent basis for MMA and EA.

The invention is further illustrated by the following examples:

EXAMPLE 1 — PREPARATION OF PARTIALLY EPOXIDIZED OIL

PELO was prepared via the resin technique. The charge consisted of alkali-refined linseed oil, 50 per cent hydrogen peroxide, glacial acetic acid and a sulfonated polystyrene ion exchange resin (Dowex 50W–X8 resin), as acid catalyst. The PELO contained 2.42 per cent oxirane and was based on the following charge:

|  | Grams | Moles |
| --- | --- | --- |
| Alkali Refined linseed oil (6 moles ethylene groups per mole of linseed oil; Iod. Val. ca. 175) | 500.0 | 0.574 |
| 50% $H_2O_2$ solution | 80.10 | 1.180 |
| Glacial acetic acid | 40.05 | 0.668 |
| Dowex 50W–X8 (50–100 mesh) resin | 35.00 | |

The oil, acid and resin were charged into a 1000 ml three-neck round bottom flask equipped with a mechanical stirrer, thermometer, and dropping funnel. The flask was set in a water bath equipped to heat and cool the reaction as needed. The flask was unstoppered to allow free air circulation. The hydrogen peroxide was added slowly from a dropping funnel to the moderately agitated mixture. Its addition rate was controlled so that the temperature of the reaction mixture remained below 50° C. When the hydrogen peroxide addition was complete, the temperature was raised to 50° C and held for 2 hours by means of the water bath. The water bath was removed and the mixture was allowed to cool to room temperature with continuous moderate agitation. After standing overnight, the oil and aqueous layers were separated from resin.

The acidic components were removed from the oil by dilution with an equal volume of hexane followed by washing several times with a saturated solution of sodium bicarbonate until neutral. The oil-hexane layer was dried overnight over anhydrous sodium sulfate, after which the hexane was removed under reduced pressure.

The amount of epoxidization was determined by the method of Durbetaki (Anal. Chem., 28, 2000–2001, 1956). This procedure involves the direct titration of oxirane oxygen with 0.1 N hydrogen bromide in glacial acetic acid to a crystal violet end point. Any degree of epoxidation is obtainable by this process. Usually 1.1 moles of 50 percent hydrogen peroxide will convert 1 mole of ethylene groups into the equivalent 1 mole of oxirane. Thus, a wide range of variously epoxidized oils can be made by this process, as seen in the following table:

TABLE I

| OIL | Double Bonds per mole of oil | Bonds converted to oxirane | % oxirane oxygen |
| --- | --- | --- | --- |
| Linseed | 6 | 1 | 1.79 |
|  |  | 2 | 3.5 |

| | | 6 | | 10 |
|---|---|---|---|---|
| Safflower | 5.4 | 1 | 1.79 | |
| and | | 3 | 3.5 | |
| Sunflower | | 5.4 | | 8.9 |
| essentially same fatty acid composition | | | | |

Therefore 1.8 percent oxirane equals disappearance of a double bond.

EXAMPLES 2 – 7 — PREPARATION OF ACRYLIC RESINS

The acrylate copolymers bearing pendent hydroxyl groups were prepared by copolymerizing hydroxyethyl methacrylate, HEMA, methyl methacrylate, MMA, and ethyl acrylate, EA. All of the resins were prepared by the solution method. The solvent was β-ethoxy-ethylacetate,Cellosolve acetate, Union Carbide. Azobisisobutyronitrile, VAZO, was used as the free radical initiator. The hydroxyl percentage was changed by using different weight ratios of the monomers. The hydroxyl content of the acrylic copolymers ranged from 1.5 to 3.0 per cent of resin weight as shown in Table II:

TABLE II.—MOLECULAR WEIGHTS AND COMPOSITIONS OF COPOLYMER POLY-ACRYLATE RESINS BASED ON LOW MOLECULAR WEIGHT HYDROXYL ALKYL ACRYLATES

| | | Concentration by weight | | Properties of resins | | |
|---|---|---|---|---|---|---|
| Ex. No. | Weight ratio of monomers (HEMA:MMA:EA) | Monomer,[1] percent | Initiator,[2] percent | Hydroxyl, percent by wt. | Content OH's per mole | Molecular weight [3] |
| 2 | 11:42.5:42.5 | 50 | 4 | 1.5 | 3.7 | 4,200 |
| 3 | 11:42.5:42.5 | 50 | 2 | 1.5 | 4.8 | 5,500 |
| 4 | 16:45:45 | 50 | 4 | 2.0 | 4.7 | 4,000 |
| 5 | 16:45:45 | 50 | 2 | 2.0 | 6.7 | 5,665 |
| 6 | 27:45:45 | 25 | 4 | 3.0 | 5.8 | 3,300 |
| 7 | 27:45:45 | 25 | 2 | 3.0 | 9.0 | 5,100 |
| 8 | [4] 13.3:43.7:43.7 | 50 | 4 | 1.5 | 3.5 | 4,000 |

[1] In Cellosolve acetate.
[2] Azobisisobutyronitrile.
[3] Number average.
[4] Hydroxy propyl methacrylate, (HPMA:NMA:EA).

The molecular weights of the resins were varied by changing the initiator concentration. A concentration of 2 per cent VAZO based on the weight of the monomers produced acrylic copolymers with molecular weights in the range of 5,000 – 6,000, while a 4 per cent concentration gave lower molecular weight products in the range of 3,000 – 4,000.

Although azobisisobutyronitrile, VAZO, was used as the initiator to effect polymerization of the acrylic monomers described herein, and is the preferred initiator, peroxides may also be used, as suggested in trade literature on the utilization of acrylic monomers by the various procedures.

The monomers were polymerized as 25 per cent solutions in Cellosolve acetate when there was 3 per cent hydroxyl in the resins. For the resins containing 1.5 per cent and 2 per cent hydroxyl, the monomers were polymerized as 50 per cent solutions.

The charge that was used to prepare a typical low molecular acrylic copolymer containing 1.5 per cent hydroxyl by weight is shown below:

| | Grams | Mole |
|---|---|---|
| Hydroxyethyl methacrylate, HEMA | 11.0 | 0.085 |
| Methyl methacrylate, MMA | 42.5 | 0.425 |
| Ethyl acrylate, EA | 42.5 | 0.425 |
| Azobisisobutyronitrile, VAZO | 3.84 | |
| Cellosolve Acetate | 99.0 | |

Standard taper glassware was used in this synthesis. The monomers were mixed with the Cellosolve acetate and together with the initiator were charged into a 500 ml three-neck standard taper flask equipped with a mechanical stirrer, inert gas inlet, water cooled condenser and thermometer. The charge was gradually heated, in about 20 minutes, to 85° C and maintained at this temperature for 5 hours.

The non-volatile content of the polymer solutions was determined by placing approximately 0.5 grams of the resin solution in a tared aluminum moisture dish. This was heated in an oven at 140° C to a constant weight.

The extent of conversion of monomers to polymers was better than 98 per cent. The number average molecular weights of these resins was determined with a Mechrolab 301A vapor pressure osmometer. Analytical grade methyl ethyl ketone was used as the solvent. Benzil recrystallized from methanol was used to standardize the instrument. The average number of hydroxyl groups per mole was calculated from the hydroxyl content in the original monomer mixture and the molecular weights as determined by the vapor pressure osmometer.

There are several catalysts that may be used to couple the epoxidized oils with the acrylic resins with pendent hydroxyl groups. These are stannic chloride pentahydrate, anhydrous stannic chloride, benzyl trimethylammonium hydroxide, potassium hydroxide, triethyl amine, tetraethylammonium bromide, N,N-dimethylbenzylamine, and boron trifluoride. However, we have found that the best conversions, i.e. copolymer, were obtained with stannic chloride pentahydrate, $SnCl_4 \cdot 5H_2O$. Further, it was discovered that the method of addition of this catalyst to the reaction mixture and the reaction temperature governed some of the final properties of the oil-acrylic copolymer. The amount of catalyst varied according to the oxirane contents of the oils. Thus, when the oxirane content was 2.42%, 1.15% $SnCl_4 \cdot 5$ $H_2O$ based on oil weight was used. For other oxirane contents the amounts of catalyst were varied directly. Further, all of the catalyst could be added at the beginning of the reaction, which we call method A for convenience, or in increments as the reaction proceeded at a lower temperature, which we call method B. Some differences in the quality of the final copolymer have been observed.

In lieu of hydroxyethylmethacrylate other lower hydroxy alkyl acrylates may be used. Hydroxypropyl (HPMA) methacrylate is an example. Other hydroxy acrylates are the aldol condensation products of formaldehyde and diacetone acrylamide copolymers. This is:

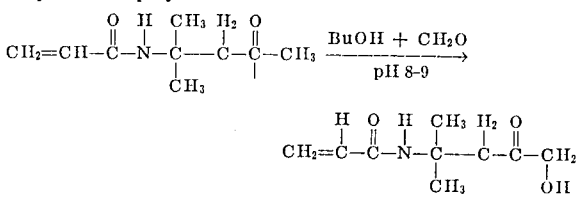

EXAMPLES 9 – 34

PREPARATION OF OIL ACRYLIC COPOLYMERS VIA METHOD A

The acrylic polymers were not recovered from the Cellosolve acetate solution. The PELO was added as a Cellosolve acetate solution to the acrylic resin solution. Both solutions had the same non-volatile content. The amounts of PELO and acrylic resin were calculated so that the oxirane and hydroxyl groups were present in molar amounts.

Stannic chloride pentahydrate was used as the catalyst. The amounts varied according to the PELO oxirane content. No attempt was made to remove the catalyst from the product.

The oil, resin and all of the catalyst were charged into a 250 ml reaction flask equipped with a mechanical stirrer, thermometer and water cooled condenser. The mixture was heated to 100° C and held at this temperature for 2 hours. This mixture, initially, was incompatible but upon heating, it became compatible. As the reaction proceeded, the viscosity of the 50 per cent NV mixture increased and the color changed from near colorless to a deep yellow. Table III shows the composition and properties of the resins prepared by method A.

usable. Generally PELO with oxirane content between about 2.4 and 5.5 and acrylic resins having about 1.5 to 2 per cent hydroxyl and molecular weights between about 4,000 and 5,700 produced usable compositions.

Drying time studies were conducted on the reaction products cast on glass plates so as to give films 2 mils thick after drying. The naphthenate drier combination was 0.05 per cent Co and 0.05 percent Ca as metals based on the oil weight. The touch dry time was defined as the time when none of the film was transferred to the finger when the film was touched.

The film hardness was determined by the Sward Rocker calibrated for 100 oscillations on a clean plate glass. The number of rocks is expressed as a percent of that on plate TABLE III.—RELATIONSHIP OF PELO OXIRANE CONTENT WITH RESIN HYDROXYL CONTENT AND MOLECULAR WEIGHT OBTAINED FROM RESULTS ON THE HEMA MOIETY OBTAINED VIA METHOD A

| Example No. | PELO Percent Oxirane | Percent by wt. in Groups A and B | Resin [3] Group A with 1.5% OH, 4,200 mol wt. | | Group B with 1.5% OH, 5,500 mol wt. | |
|---|---|---|---|---|---|---|
| | | | Viscosity [1] | Rocker Hardness [2] | Viscosity [1] | Rocker Hardness [2] |
| 9-10 | 1.70 | 45.4 | ([3]) | ([4]) | ([3]) | ([4]) |
| 1-12 | 2.42 | 36.8 | 10.0 | 14 | 25.0 | 14 |
| 3-14 | 2.77 | 33.7 | 10.7 | 17 | 27.0 | 14 |
| 5-16 | 3.20 | 30.6 | 11.2 | 17 | 30.0 | 16 |
| 7-18 | 3.66 | 27.8 | 12.0 | 18 | 36.2 | 17 |
| 9-20 | 5.47 | 20.5 | 14.0 | 22 | 125. | 20 |
| 1-22 | 8.80 | 13.8 | 63.4 | 23 | >148 | 30 |
| 3-24 | 9.30 | 13.2 | 98.5 | 24 | Gel | |
| | | Percent by wt. in Groups C and D | Group C with 2.0% OH, 4,000 mol wt. | | Group D with 2% OH, 5,665 mol wt. | |
| 5-26 | 1.70 | 52.5 | ([3]) | ([4]) | ([3]) | ([4]) |
| 7-28 | 2.42 | 43.2 | 11.5 | 14 | 36.0 | 15 |
| 9-30 | 2.77 | 40.5 | 13.0 | 15 | 46.0 | 15 |
| 1-32 | 3.20 | 37.0 | 23.0 | 17 | Gel | |
| 33 | 3.66 | 33.9 | 32.0 | 18 | | |
| 34 | 5.47 | 25.6 | Gel | | | |

[1] Viscosity at 50% NV in Cellosolve acetate.
[2] Sward Rocker Hardness of the PELO acrylic copolymer films.
[3] 2-phase product.
[4] Oily film.
NOTE.—Resin composition—Groups A and B—HEMA/MMA/:EA=11/42.5/42.5; Groups C and D—HEMA/MMA/:EA=16/45/45.

When the solvent was removed from the oil-resin copolymer to obtain 100 per cent NV material, it was found that this copolymer was insoluble in the many of the common solvents, such as acetone, in which the original components were easily and completely soluble.

The viscosity of the acrylic resins and products at 50 per cent dilution in Cellosolve acetate was measured against Gardner-Holdt Bubble Viscometer tubes (Gardner, A. H. and Sward, G. G., "Physical and Chemical Examination, Paints, Varnishes, Lacquers, and Colors", Gardner Laboratory, Inc., Bethesda, Md., 1962). The color of one series of reaction products was obtained by comparing the samples in viscosity tubes against the Gardner 1933 standards. The oxirane contents were determined by the method of Durbetaki.

Thin layer chromatography (TLC) was also used as a means to confirm oxirane disappearance. The TLC 10 cm × 20 cm plates were coated with silica gel according to the method of Stahl (J. Am. Oil Chemists' Soc., 38, 708–727, 1961). The thickness of the dry adsorbent layer was approximately 0.25 mm. A Desaga applicator was used. The plates were activated in an oven at 120° for 1 hour and used immediately. The solvent system consisted of hexane-ethyl ether-glacial acetic acid (V) 70:30:2. Iodine vapor was used to develop the spots.

In order to determine the relationship between oxirane content in the PELO's and the hydroxyl content and the molecular weight of the acrylic resins, series of copolymers were investigated. The hydroxyl content of the resins was between 1.5 per cent and 3 per cent and their molecular weights were between 3,300 and 5,665. These were reacted with PELOs with oxirane contents from 1.7 per cent to 9.3 per cent. These data are shown in part in Table II. Copolymers which showed no gelation in 50 per cent Cellosolve acetate were considered glass.

The films were cast on tin panels and allowed to age for one week. Conical mandrel and reverse impact tests were run on these panels.

EXAMPLES 35 – 40

PROPERTIES OF COATING FILMS OF PRODUCTS

PREPARED VIA METHOD A

The properties of some typical PELO-acrylic copolymers prepared by reacting the acrylic resins of Table II with PELO containing 2.42 per cent oxirane are shown in Table IV. As the percent of the oil in the product increases, the properties change, i.e. film hardness decreases, while the drying time and impact resistance are increased. It was observed that solutions of the products which were prepared by reacting PELO containing less than 3.66 per cent oxirane with 1.5 per cent and 2 per cent hydroxyl containing acrylic resins gradually formed two phases on standing. According to TLC results, the top layer consists of non-epoxidized linseed oil and some PELO homopolymer. As the oxirane content is increased from 1.70 per cent to 3.66 per cent the upper phase becomes smaller and when 5.47 per cent PELO is used, the solution remained homogeneous on standing.

The maximum oxirane content in the PELO which can be reacted with each of the acrylic resins via method A without gelation was determined and is shown in part in Table III. The copolymers obtained from resins containing 3 per cent hydroxyl were either gels or produced films which remained tacky.

weeks, they were placed in a cardboard box which was baffled to allow free air circulation and eliminate all direct light. One-half of the coated plate was in the darkened interior and one-half exposed to light. The box was placed in a north window and exposed for 3 months. The panels were then examined and the yellowing was visually rated. The exposed portions of

TABLE IV.—PROPERTIES OF PELO[6]-ACRYLIC RESIN COPOLYMERS PREPARED VIA METHOD A

| Ex. No. | Acrylic resin properties | | Product properties | | | Film properties | | | | |
|---|---|---|---|---|---|---|---|---|---|---|
| | Percent OH | Viscosity,[1] in stokes | Percent oil by wt. | Color | Viscosity[1] | Dry time (min.) | Hardness[2] | | Flexibility[4] | |
| | | | | | | | 24 hrs. | 1 week | 1/8" mandril | Impact[3] |
| 35 | 1.5 | 15.6 | 36.8 | 6 | 14.9 | 25 | 14 | 15 | Pass | 60 |
| 36 | 1.5 | 40.0 | 36.8 | 9 | 39.0 | 30 | 13 | 15 | ...do.... | 62 |
| 37 | 2.0 | 17.6 | 43.2 | 6 | 11.7 | 30 | 13 | 14 | ...do.... | 70 |
| 38 | 2.0 | 46.3 | 43.2 | 11 | 38.2 | 35 | 12 | 15 | ...do.... | 70 |
| 39 | 3.0 | 12.9 | 53.8 | 9 | 16.6 | 40 | [5]6 | [5]9 | ...do.... | >80 |
| 40 | 3.0 | 23.7 | | | Gel | | | | | |

[1] In Cellosolve acetate at 50% NV (stokes).
[2] 2 mil film on glass, cured at 25° C. (in rocks).
[3] In inch pounds at rupture.
[4] 2 mil film cast on tin plates.
[5] Somewhat tacky.
[6] Oxirane, percent 2.42.

The reaction product formed when PELO containing 8.8 or 9.3 per cent oxirane reacted with an acrylic resin of low hydroxyl content is essentially a lacquer type product. The drying process essentially involves solvent evaporation. Nearly all of the double bonds in the oil have previously been consumed by epoxidation so that there is very little oxidative polymerization possible during film air drying. Special flexibility tests not shown in the tables indicated an impact resistance of 2 - 3 in. lb. which is about the same as for acrylic films per se.

In products produced from low oxirane content linseed oils, i.e. less than 3.5 percent, there are sufficient unreacted ethylene groups remaining so that the polymers can convert to good films by oxidative polymerization reactions.

The dried films of the group A products, Table III, were tested for chemical resistance with 5 % $H_2SO_4$, 5 % NaOH and acetone. The films were cast on glass plates and dried for a week prior to testing chemical resistance. Film failure did not occur with any of the copolymers after 12 hours of immersion in the acid bath. The alkali resistance was best for those products which contained low percentages of oil. Films containing 36.8 per cent oil failed after 14 minutes, while films containing 20.5 per cent oil required 11 hours before noticeable failure. All of the films were very sensitive to acetone. This is in line with products dried by oxidative polymerization which would yield weaker films.

Yellowing studies were made on PELO, linseed oil, and a PELO-acrylic resin copolymer. The yellowing tendency of the films was determined by use of specially constructed exposure boxes. The films of linseed oil, PELO, and a PELO-acrylic copolymer were cast on glass. After the films had air dried 2 the PELO and linseed oil films showed moderate yellowing. This yellowing effect was more pronounced on the portions not exposed to the light, particularly in the case of linseed oil. There was very slight yellowing of the films of the oil-modified acrylics.

EXAMPLES 41 — 51

PREPARATION AND PROPERTIES OF OIL-ACRYLIC RESIN COPOLYMERS VIA METHOD B

Method B varies from method A in the reaction temperature which is 80° C rather than 100° C and the catalyst is added in increments as the reaction proceeds. A quantity of catalyst equal in weight to 0.1 percent of the non-volatile is added to the mixture initially and every 15–30 minutes thereafter until the reaction is complete, or until just prior to the point of gelation. Method B consistently produces products of higher viscosities and lighter color as compared to those prepared via method A.

In the case of method B, when the products are cured both by baking for 1 hour at 140° C and by air drying, the results shown in Table IV indicate that the baked finishes are improved in hardness, flexibility. The baked films are relatively unaffected by acetone and the alkali resistance is also much improved. The baked films range in color from slight yellow (Example 46) to deep yellow (Example 41). The air dried films are colorless.

Table V shows compositions and properties of resins made by method B:

TABLE V.—COMPOSITION AND PROPERTIES OF PELO-ACRYLIC RESIN[1] COPOLYMERS PREPARED VIA METHOD B

| Example No. | Percent oxirane in PELO | Extent of reaction[2] | Product viscosity, 50% NV (stokes) | Sward Rocker Hardness of 2 mil dry film on glass | | | | Flexibility of 2 mil dry films on tin plates aged for one week | | | |
|---|---|---|---|---|---|---|---|---|---|---|---|
| | | | | Cured at room temp. | | Baked at 140° for 1 hr. | | 1/8" conical mandrel | | Reverse impact (in., pounds) | |
| | | | | 24 hr. | 1 week | 24 hr. | 1 week | Air dried | Baked | Air dried | Baked |
| 41 | 2.2 | 95 | 13 | 10 | 17 | 16 | 18 | O.K. | O.K. | 80 | >80 |
| 42 | 2.8 | 95 | 18 | 10 | 17 | 18 | 19 | O.K. | O.K. | 45 | >80 |
| 43 | 3.2 | 98 | 98 | 10 | 17 | 18 | 20 | O.K. | O.K. | 30 | >80 |
| 44 | 3.7 | 90 | ([3]) | 11 | 19 | 18 | 23 | O.K. | O.K. | 25 | 50 |
| 45 | 5.5 | 60 | ([3]) | 14 | 23 | 34 | 40 | O.K. | O.K. | 24 | 28 |
| 46 | 9.4 | 35 | ([3]) | 15 | 25 | 37 | 44 | O.K. | O.K. | >1 | 1 |
| 47 | ([5]) | | ([4]) | 20 | 26 | 54 | 54 | O.K. | Fail | >1 | >1 |

[1] Acrylic copolymers of HEMA, MMA, EA in weight ratios of 11/42.5/42.5, 1.5% OH by weight, molecular.
[2] Calculated by measuring the disappearance of oxirane groups via the Durbetaki method.
[3] Near gel.
[4] 18 stokes.
[5] Acrylic copolymer, per se.

Examples 48 and 49, summarized in Table VI, illustrate typical products possible by varying the monomers of the acrylic resin. In this case, hydroxylpropyl methacrylate is used as the hydroxyl bearing monomer. Hydroxylpropyl acrylate can be used in a similar fashion. Other monomers may be substituted for MMA and EA, depending on what properties are desired for the acrylic copolymer. For example, butyl methacrylate and hexyl methacrylate may be used to introduce additional flexibility. Styrene may be introduced if additional hardness is desired.

TABLE VI.—COMPOSITION AND PROPERTIES OF PELO-ACRYLIC RESIN [1] COPOLYMERS PREPARED VIA METHOD B

| Example No. | Percent oxirane in PELO | Extent of reaction [2] | Viscosity of product (stokes) | Touch dry time (min.) | 24 hr. Sward Hardness | |
|---|---|---|---|---|---|---|
| | | | | | Air dry | Baked |
| 48 | 2.8 | 94 | 11 | 35 | 12 | 22 |
| 49 | 3.2 | 93 | 13 | 28 | 12 | 26 |

[1] Acrylic copolymer of HPMA, EA and MMA in weight ratio of 13.1:43.7:43.7, 1.5% OH by weight, 50% viscosity of 18 stokes, molecular weight approximately 4,000.
[2] Calculated by means of the disappearance of oxirane group via Durbetaki method.

Examples 50 and 51, summarized in Table VII, illustrate typical products possible when using a different epoxidized oil, safflower oil in this case. The results are roughly the same for the cases when PELO was used, both for air dried and baked films:

TABLE VII.—COMPOSITION AND PROPERTIES OF PESO [1]-ACRYLIC RESIN COPOLYMERS PREPARED VIA METHOD B

| Ex. No. | Polyacrylate description monomers used and weight ratios | Extent of reaction,[2] percent | 50% NV viscosity of product | Touch dry time | 24 hr. Sward Hardness | |
|---|---|---|---|---|---|---|
| | | | | | Air dry | Baked |
| 50 | HEMA:MMA:EA 11:42.5:42.5 | 93 | 18 | 29 | 12 | 18 |
| 51 | HPMA:MMA:EA 13.3:43.7:43.7 | 91 | 13 | 24 | 14 | 24 |

[1] Partially expoxidized safflower oil was epoxidized in the same manner as the PELO samples. The oxirane content of this PESO was 2.2% as determined by the method of Durbetaki.
[2] Calculated by means of the disppearance of oxirane group via Durbetaki method.

SUMMARY

A family of epoxidized oil-acrylic resin copolymers have been prepared via method A by reacting PELOs containing between about 1.7 per cent and 9.4 per cent oxirane with acrylic resins containing about 1.5 per cent to 2.0 per cent OH and a molecular weight in the range of about 3,000 to 5,700. The products prepared from partially epoxidized oil containing less than 2.2 per cent oxirane were found to contain too much non-epoxidized oil and therefore produced unstable films.

Optimum air drying products may be synthesized from oils containing between about 2.4 per cent and 5.5 per cent oxirane by reactions with the acrylic resins as described above, via method A.

The products prepared from PELO via method A with the oxirane in the range of about 2.4 to 5.5 per cent by weight were found to dry by solvent evaporation followed by oxidative polymerization. The products prepared from essentially fully epoxidized oils of a lacquer type which formed films by solvent evaporation only. In these cases the epoxy oils act no doubt, as built-in plasticizers. The soluble products produced films of high gloss, good hardness, flexibility, anti-yellowing and chemical resistance.

The product prepared via method B produced films which could be cured either by air drying or baking. The air dried films were of high gloss, good hardness, flexibility, yellowing and chemical resistance. The baked films were extremely hard, flexible, and very chemically resistant to such reagents as acetone and NaOH.

It is apparent that many modifications and variations of this invention as hereinbefore set forth may be made without departing from the spirit and scope thereof. The specific embodiments described are given by way of example only and the invention is limited only by the terms of the appended claims.

The embodiments of the invention in which an exclusive property or privilege is claimed are defined as follows:

1. A composition for producing coating air driable and heat curable films of high gloss, good hardness, flexibility, resistance to yellowing and chemical resistance, said composition comprising the catalyzed reaction product of a partially epoxidized drying oil containing between about 2.2 and 9.4 per cent oxirane by weight, with an acrylic resin copolymer bearing pendent reactive hydroxyl groups, said acrylic resin being a copolymer of a hydroxyalkyl methacrylate with at least one acrylate or methacrylate ester selected from the group consisting of methyl, ethyl, butyl and hexyl esters, said acrylic resin containing between about 1.5 to 2.0 per cent hydroxyl by weight and having molecular weight between about 3,000 to 5,700.

2. A composition according to claim 1 further characterized in that said partially epoxidized drying oil contains between about 2.4 and 5.5 per cent oxirane.

3. A composition according to claim 1 further characterized in that said reaction products are present in proportion to provide approximately equal oxirane-hydroxyl molar amounts.

4. A composition according to claim 1 further characterized in that said acrylic resin is a copolymer of a hydroxyalkyl methacrylate in which the alkyl radical is selected from the group consisting of ethyl and propyl, with at least one acrylate or methacrylate ester.

5. A composition according to claim 4 further characterized in that said hydroxyalkyl methacrylate and said acrylate or methacrylate ester are present in the ratio of from about 1 part by weight of hydroxyalkyl methacrylate to about 3 to 8 parts of said acrylate or methacrylate ester.

6. The method of making the composition of claim 1 which comprises admixing a partially epoxidized drying oil containing between about 2.2 and 9.4 per cent oxirane by weight, with an acrylic resin copolymer bearing pendent reactive hydroxyl groups, said acrylic resin being a copolymer of an hydroxy-alkyl methacrylate with at least one acrylate or methacrylate ester selected from the group consisting of methyl, ethyl, butyl and hexyl esters, said acrylic resin containing between about 1.5 to 2.0 per cent by weight hydroxyl and having molecular weight between about 3,000 to 5,700, said drying oil and resin being present in about equal oxirane-hydroxyl molar amounts in the presence of a catalyst in a mutual solvent for the reactants, and heating with agitation until said reactants are substantially completely reacted.

7. The method according to claim 6 further characterized in that substantially all of the catalyst is first admixed with said reactants and said reactants are heated at about 100° C for about 2 hours.

8. The method according to claim 6 further characterized in that catalyst in the proportion of about 0.1 per cent by weight of the non-volatile is initially admixed with the reactants and said reactants are heated to about 80° C, the mixture is maintained at about 80° C and increments of catalyst in the amount of about 0.1 per cent of the non-volatile are added periodically at intervals between about 15 and 20 minutes until said reactants are substantially completely reacted.

9. The method according to claim 6 further characterized in that said partially epoxidized drying oil is partially epoxidized linseed oil.

10. The method according to claim 8 further characterized in that said catalyst is stannic chloride pentahydrate present in amount of about 1.5 per cent by weight of catalyst to epoxidized oil for each 2.4 per cent oxirane contained in said oil.

11. The method according to claim 10 further characterized in that catalyst in the proportion of about 0.1 per cent by weight of the non-volatile is initially admixed with the reactants and said reactants are heated to about 80° C, the mixture is maintained at about 80° C and increments of catalyst in the amount of about 0.1 per cent of the non-volatile are added periodically at intervals between about 15 and 20 minutes until said reactants are substantially completely reacted.

12. The method according to claim 9 further characterized in that said acrylic resin is a copolymer of a hydroxyalkyl methacrylate in which the alkyl radical is selected from the group consisting of ethyl and propyl, with at least one acrylate or methacrylate ester.

13. The method according to claim 12 further characterized in that said hydroxyalkyl methacrylate and said acrylate or methacrylate ester are present in the ratio of from about 1 part by weight of hydroxyalkyl methacrylate to about 3 to 8 parts of said acrylate or methacrylate ester.

* * * * *

UNITED STATES PATENT OFFICE
CERTIFICATE OF CORRECTION

Patent No. 3,676,384     Dated July 11, 1972

Inventor(s) RHEINECK, ALFRED E., ET. AL.

It is certified that error appears in the above-identified patent and that said Letters Patent are hereby corrected as shown below:

On the cover sheet [73], "North Dakota State University Memorial Foundation, Fargo, N.Dak." should read -- North Dakota State University Development Foundation, Fargo, N. Dak., a corporation of North Dakota -- .

Signed and sealed this 25th day of December 1973.

(SEAL)
Attest:

EDWARD M. FLETCHER, JR.
Attesting Officer

RENE D. TEGTMEYER
Acting Commissioner of Patents